(12) United States Patent
Chockalingam et al.

(10) Patent No.: US 9,524,217 B1
(45) Date of Patent: Dec. 20, 2016

(54) FEDERATED RESTORES OF AVAILABILITY GROUPS

(71) Applicant: EMC Corporation, Hopkinton, MA (US)

(72) Inventors: Elango Chockalingam, Bangalore (IN); Nikhil Ambastha, Bangalore (IN); Vedavathi Ht, Bangalore (IN); Manjesh Venkatanarayana Chikkanayakanahally, Bangalore (IN); Krishnendu Bagchi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 231 days.

(21) Appl. No.: 14/317,328

(22) Filed: Jun. 27, 2014

(51) Int. Cl.
*G06F 17/30* (2006.01)
*G06F 11/14* (2006.01)

(52) U.S. Cl.
CPC ................................ *G06F 11/1458* (2013.01)

(58) Field of Classification Search
CPC . G06F 17/30; G06F 17/30575; G06F 11/1458
USPC .................................................. 707/600–899
See application file for complete search history.

(56) References Cited

U.S. PATENT DOCUMENTS

2013/0238554 A1\* 9/2013 Yucel ............... G06F 17/30289
707/610

\* cited by examiner

*Primary Examiner* — Isaac M Woo
(74) *Attorney, Agent, or Firm* — Dergosits & Noah LLP; Todd A. Noah

(57) ABSTRACT

Federated restores of availability groups are described. A system backs up an availability group from a node in a cluster of nodes based on an identifier of the cluster of nodes. The system outputs information associated with at least one database replica in any availability group which is backed up based on the identifier of the cluster of nodes in response to a user request for the information. The system restores a user-selected database replica to a user-selected node in the cluster of nodes based on a user selecting at least some of the information.

20 Claims, 3 Drawing Sheets

FEDERATED RESTORES OF AVAILABILITY GROUPS

BACKGROUND

If a software error corrupts a data object, or if erroneous data updates the data object, a data protection administrator may restore the data object to a previous uncorrupted state that does not include the corrupted or erroneous data. A backup application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup application to execute a restore operation to restore a copy of the corresponding backup files for that state to the data object.

Some structured query language servers, such as Microsoft's SQL Server 2012, include an "Always On" availability group, which is a high-availability and disaster-recovery solution that provides an enterprise-level alternative to database mirroring. An availability group maximizes the availability of a set of user databases for an enterprise, and supports a failover environment for a discrete set of user databases, known as availability databases, that fail over together from one server, or node, in a cluster to another server, or node, in the cluster. An availability group supports a set of read-write primary replicas of a database and other sets of corresponding secondary replicas of the database. Secondary replicas may be made available for read-only access and/or some backup operations. A system administrator may specify availability group properties, such as backup preference among primary replicas and secondary replicas for running backup jobs, which can thereby improve backup performance.

DETAILED DESCRIPTION

Figure 1:
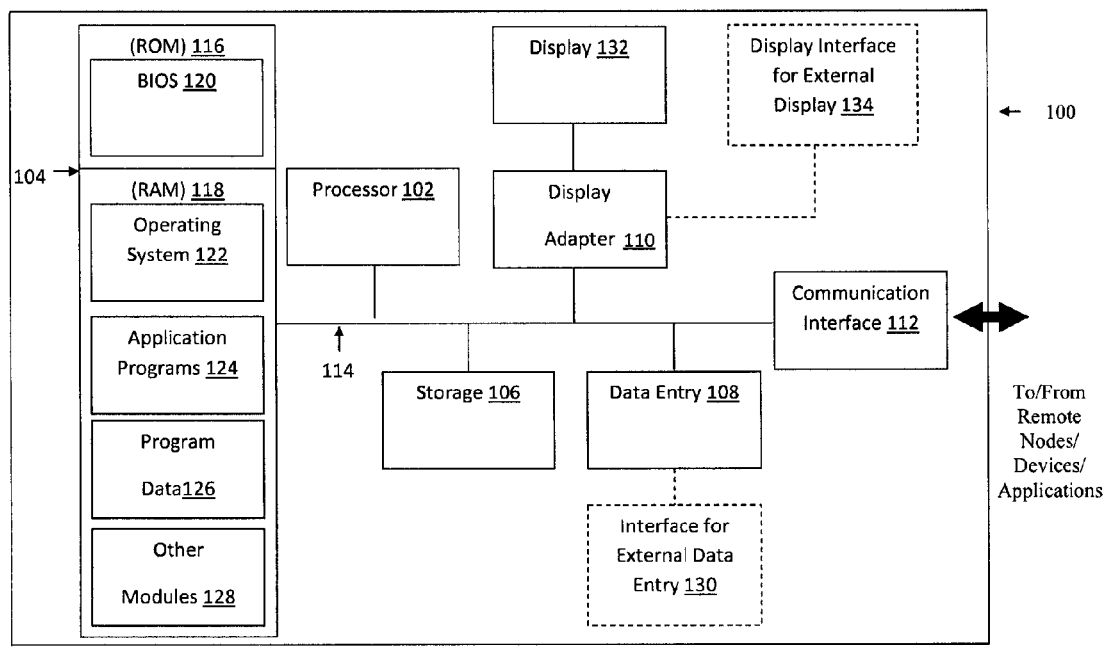
FIG. 1 is a block diagram illustrating an example hardware device in which the subject matter may be implemented.

Challenges exist with restoring backed up availability groups. Backup applications offer no options to restore a backup to a node other than the node from which the backup was created because the backup application assumes that a backup from a node will always be restored to the same node, whereas a backup of an availability group from one node in a cluster may need to be restored to a different node in the cluster in response to a system administrator changing the availability group properties. Since backup applications store backups based on the node from which the backup was created, backup applications do not allow a user who backed up an availability group from one node to view information about backups from other nodes, even though the other nodes may be in the same cluster as the node from which the user created the backup of the availability group. Although backup applications offer a copy restore option that enables a user to restore a database replica created from a different node than the node from which the user created a backup, the copy restore option is limited to restoring a single database replica at a time and also requires the user to set the properties before performing the restoration of each individual database replica. Additionally, the copy restore option creates an additional copy of a database replica in a node, such that the node may continue to retain a previous version of the database replica in addition to the additional copy of the database replica, which wastes storage on the node and may cause confusion. If a backup application begins to restore a database replica to a first instance of an availability group in one node, the replication applied to all of the instances of the availability groups distributed across various nodes is temporarily broken, such that data saved to one of the other instances during the restore process is lost when the other instance is subsequently overwritten during the restore process.

Embodiments herein provide federated restores of availability groups. An availability group is backed up from a node in a cluster of nodes based on an identifier of the cluster of nodes. Information associated with at least one database replica in any availability group which is backed up based on the identifier of the cluster of nodes is output in response to a user request for the information. A user-selected database replica is restored to a user-selected node in the cluster of nodes based on a user selecting at least some of the information.

For example, a backup application backs up availability group 1 from node 1 in a cluster based on the cluster name. The backup application outputs information associated with database replicas A and B in availability group 1 which is backed up based on the cluster name in response to a user request for the information. The backup application restores the user-selected database replica A in a backup of availability group 1 from node 1 to the user-selected node 2 in the cluster based on a user selecting the cluster name, database replica A in availability group 1, and node 2. The backup application allows a user who backed up an availability group from one node to view information about backups from other nodes. The backup application overwrites any existing version of the database replica restored to a node rather than creating an additional copy of the database replica in the node, and may restore a backup to a node other than the node from which the backup was created.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for identifying preferred nodes for backing up availability groups.

In the prior art, challenges exist with restoring backed up availability groups. Backup applications offer no options for a normal restore of a backup to a node other than the node from which the backup was created. Backup applications do not allow a user who backed up an availability group from one node to view information about backups from other nodes, even though the other nodes may be in the same cluster as the node from which the user created the backup of the availability group. The copy restore option is limited to restoring a single database replica at a time, requires the user to set the properties before performing the restoration of each individual database replica, and creates an additional copy of a database replica in a node, which wastes storage on the node and may cause confusion. Data saved to one instance during the restore process is lost when the instance is subsequently overwritten during the restore process. Embodiments herein provide federated restores of availability groups. A backup application allows a user who backed up an availability group from one node to view information about backups from other nodes. The backup application overwrites any existing version of the database replica restored to a node rather than creating an additional copy of the database replica in the node, and may restore a backup to a node other than the node from which the backup was created.

Figure 2:
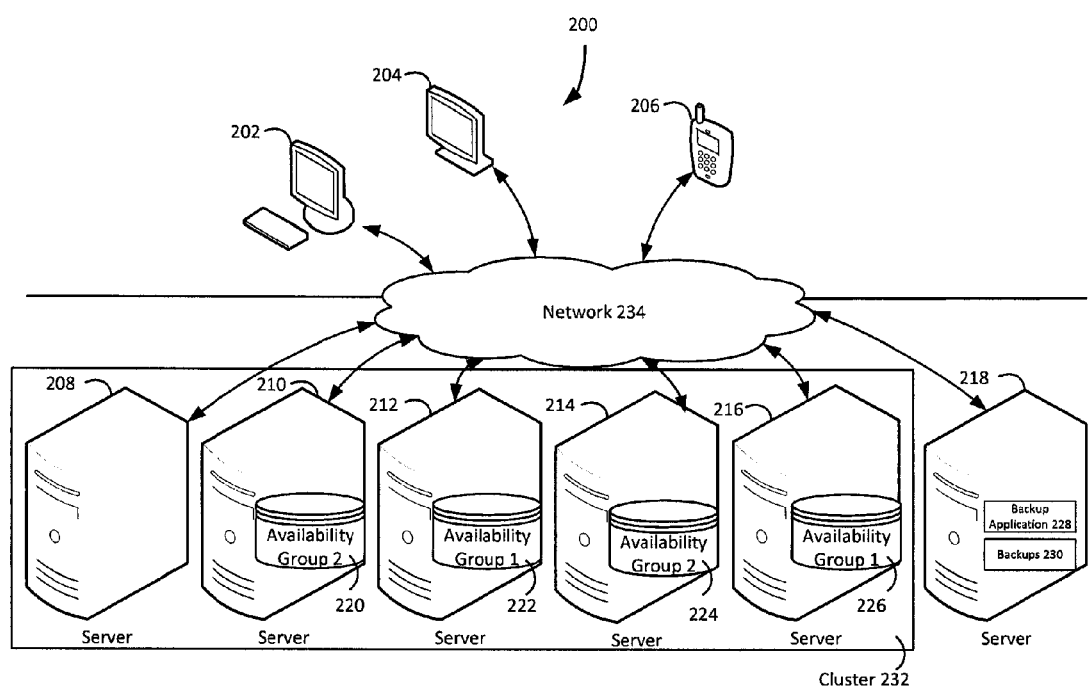
FIG. 2 illustrates a block diagram of an example system for federated restores of availability groups, under an embodiment.

FIG. 2 illustrates a block diagram of a system that implements federated restores of availability groups, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a first client 202, a second client 204, and a third client 206; and a first server 208, a second server 210, a third server 212, a fourth server 214, a fifth server 216, and a sixth server 218 that may be provided by a hosting company. The second server 210 includes a primary availability group 2 220, the third server 212 includes a primary availability group 1 222, the fourth server 214 includes a secondary availability group 2 224, the fifth server 216 includes a secondary availability group 1 226, and the sixth server 218 includes a backup application 228 and backups 230. Although FIG. 2 depicts the backups 230 residing on the sixth server 218, the backups 230 may be stored elsewhere, such as on another server or on a storage array, which are not depicted in FIG. 2. The servers 208-216 comprise a cluster 232, which does not include the sixth server 218. Therefore, the servers 208-216 may be referred to as the nodes 208-216 in the cluster 232. The clients 202-206 and the servers 208-218 communicate via a network 234. Although FIG. 2 depicts the system 200 with three clients 202-206, six servers 208-218, four availability group instances 220-226, one backup application 228, one set of backups 230, one cluster 232, and one network 234, the system 200 may include any number of clients 202-206, any number of servers 208-218, any number of availability group instances 220-226, any number of backup applications 228, any number of sets of backups 230, any number of clusters 232, and any number of networks 234. The clients 202-206 and the servers 208-218 may each be substantially similar to the system 100 depicted in FIG. 1. FIG. 2 depicts the backup application 228 residing completely on the sixth server 218, but the backup application 228 may reside completely on any of the servers 208-216, completely on any of the clients 202-206, completely on another server that is not depicted in FIG. 2, or in any combination of partially on the servers 208-218, partially on the clients 202-206, and partially on the other server.

The backup application 228 may be, for example, EMC Corporation's NetWorker® backup application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers. Although the functionality examples described in this paragraph apply to EMC Corporation's NetWorker® backup application, one of skill in the art would recognize that other backup applications and their corresponding functionalities may be used. The backup application 228 may also be implemented as a NetWorker® Module For Microsoft Applications, which, as stated above, may reside completely on any of the servers 208-216, completely on any of the clients 202-206, completely on another server that is not depicted in FIG. 2, or in any combination of partially on the servers 208-218, partially on the clients 202-206, and partially on the other server.

The backup application 228 backs up an availability group from a node in a cluster based on an identifier of the cluster. For example, the backup application 228 backs up the availability group 1 226 from the node 216 in the cluster 232 based on the name of the cluster 232. In this example, the availability group 1 222 in the node 212 stores the primary database replicas for database A and database B, and the availability group 1 226 from the node 216 stores the secondary database replicas for database A and database B. Therefore, the node 216 is the preferred node for backing up the availability group 1 because backing up the availability group 1 226 from the node 216 does not interfere with the operation of the primary database replicas for database A and database B stored by the availability group 1 222 in the node 212.

Information associated with at least one database replica in any availability group which is backed up based on the identifier of the cluster is output in response to a user request for the information. For example, the backup application 228 enables a user to select the node 214 as the destination where the database replicas will be restored, enables the user to select the name of the cluster 232 out of multiple cluster names which the backup application 228 used as the basis for backing up availability groups, enables the user to select the node 216 as the source for the restoration, enables the user to browse and select for restoration the database replicas for database A and database B which were stored from the node 216 based on the name of the cluster 232, and enables the user to set the properties for any number of selected database replicas without having to individually set the property for each selected database replica. The backup application 228 allows a user who backed up an availability group from one node to view information about backups from other nodes.

The backup application 228 may perform a full backup of a user-selected node prior to restoring a user-selected database replica to the user-selected node in the cluster. For example, when the backup application 228 begins to restore the database replicas for the database A and the database B to the availability group 1 226 in the node 216, the replication applied to the availability group 1 226 in the node 216 and the availability group 1 222 in the node 212 is temporarily broken, such that data stored to the availability group 1 222 in the node 212 during the restore of the database replicas for the database A and the database B to the availability group 1 226 in the node 216 could be lost when the backup application 228 subsequently overwrites the database replicas for the database A and the database B to the availability group 1 222 in the node 212 during the restore process. Therefore, the backup application 228 performs a full backup of the database replicas for the database A and the database B in the availability group 1 222 in the node 212 before the backup application 228 overwrites the database replicas for the database A and the database B in the availability group 1 222 in the node 212. The full backup saves the data stored to the availability group 1 222 in the node 212 during the restore of the database replicas for the database A and the database B to the availability group 1 226 in the node 216.

A user-selected database replica is restored to a user-selected node in the cluster based on a user selecting at least some of the information. For example, the backup application 228 restores the user-selected database replicas of database A and database B in the backup of the availability group 1 226 from node 216 to the user-selected node 214 based on the user selecting the name of the cluster 232 and the database replicas for database A and database B in the availability group 1, wherein the user-selected node 214 previously lacked any version of the user-selected database replicas of database A and database B. In another example, the backup application 228 restores the user-selected database replicas of database A and database B in the backup of the availability group 1 226 from node 216 to the user-selected nodes 212 and 216 by overwriting existing versions of the user-selected database replicas of database A and database B in the nodes 212 and 216. If the backup application 228 performed a full backup of the database replicas for the database A and the database B in the availability group 1 222 in the node 212, the backup application 228 overwrites the database replicas for the database A and the database B to the availability group 1 222 in the node 212 based on the full backup of the database replicas for the database A and the database B to the availability group 1 222 in the node 212, thereby saving the data stored to the availability group 1 222 in the node 212 during the restore of the database replicas for the database A and the database B to the availability group 1 226 in the node 216.

Figure 3:
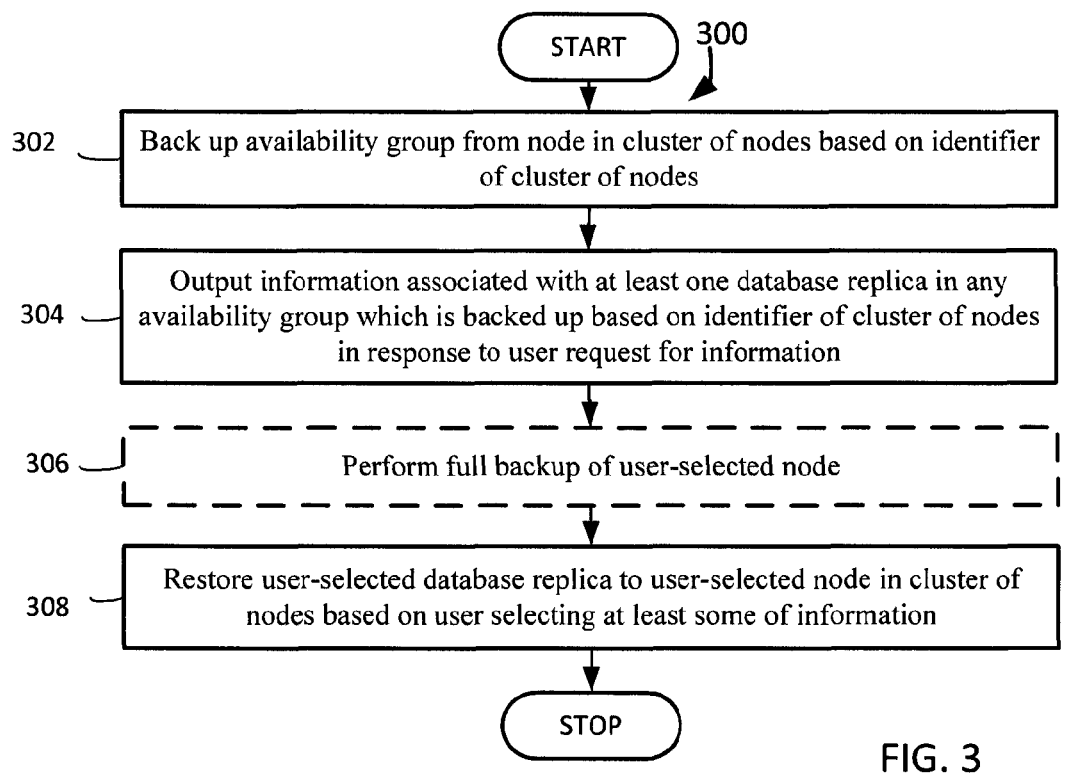
FIG. 3 is a flowchart that illustrates a method for federated restores of availability groups, under an embodiment.

FIG. 3 is a flowchart that illustrates a method for federated restores of availability groups, under an embodiment. Flowchart 300 illustrates method acts illustrated as flowchart blocks for certain steps involved in and/or between the clients 202-206 and/or the servers 208-218 of FIG. 2.

An availability group is backed up from a node in a cluster based on an identifier of the cluster, block 302. For example, the backup application 228 backs up the availability group 1 226 from the node 216 in the cluster 232 based on the name of the cluster 232.

Information associated with at least one database replica in any availability group which is backed up based on the identifier of the cluster is output in response to a user request for the information, block 304. For example, the backup application 228 enables the user to browse and select for restoration the database replicas for database A and database B which were stored from the node 216 based on the name of the cluster 232.

A full backup of a user-selected node is optionally performed prior to restoring a user-selected database replica to a user-selected node in a cluster, block 306. For example, the backup application 228 performs a full backup of the database replicas for the database A and the database B for the availability group 1 222 in the node 212 before the backup application 228 overwrites the database replicas for the database A and the database B to the availability group 1 222 in the node 212.

A user-selected database replica is restored to a user-selected node in a cluster based on a user selecting at least some of the information, block 308. For example, the backup application 228 restores the user-selected database replicas of database A and database B in the backup of the availability group 1 226 from the node 212 to the user-selected node 214 based on the user selecting the name of the cluster 232, the database replicas for database A and database B in the availability group 1, and the node 212.

Although FIG. 3 depicts the blocks 302-308 occurring in a specific order, the blocks 302-308 may occur in another order. In other implementations, each of the blocks 302-308 may also be executed in combination with other blocks and/or some blocks may be divided into a different set of blocks.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for federated restores of availability groups, the system comprising:
   a processor-based application, which when executed on a computer, will cause the processor to:
   back up an availability group from a node in a cluster of nodes based on an identifier of the cluster of nodes;
   output information associated with at least one database replica in any availability group which is backed up based on the identifier of the cluster of nodes in response to a user request for the information; and
   restore a user-selected database replica to a user-selected node in the cluster of nodes based on a user selecting at least some of the information.

2. The system of claim 1, wherein restoring the user-selected database replica to the user-selected node in the cluster of nodes comprises overwriting an existing version of the user-selected database replica.

3. The system of claim 1, wherein restoring the user-selected database replica to the user-selected node in the cluster of nodes comprises restoring a plurality of different user-selected database replicas to a corresponding plurality of different user-selected nodes in the cluster of nodes.

4. The system of claim 1, wherein the user-selected node in the cluster of nodes is the node in the cluster of nodes.

5. The system of claim 1, wherein the user-selected node in the cluster of nodes is another node in the cluster of nodes, wherein the other node previously lacked any version of the user-selected database replica.

6. The system of claim 1, wherein the processor-based application, when executed, will further cause the processor to perform a full backup of the user-selected node prior to restoring the user-selected database replica to the user-selected node.

7. The system of claim 6, wherein restoring the user-selected database replica to the user-selected node in the cluster of nodes is based on the full backup of the user-selected node performed prior to restoring the user-selected database replica to the user-selected node.

8. A computer-implemented method for federated restores of availability groups, the method comprising:
   backing up an availability group from a node in a cluster of nodes based on an identifier of the cluster of nodes;
   outputting information associated with at least one database replica in any availability group which is backed up based on the identifier of the cluster of nodes in response to a user request for the information; and
   restoring a user-selected database replica to a user-selected node in the cluster of nodes based on a user selecting at least some of the information.

9. The method of claim 8, wherein restoring the user-selected database replica to the user-selected node in the cluster of nodes comprises overwriting an existing version of the user-selected database replica.

10. The method of claim 8, wherein restoring the user-selected database replica to the user-selected node in the cluster of nodes comprises restoring a plurality of different user-selected database replicas to a corresponding plurality of different user-selected nodes in the cluster of nodes.

11. The method of claim 8, wherein the user-selected node in the cluster of nodes is the node in the cluster of nodes.

12. The method of claim 8, wherein the user-selected node in the cluster of nodes is another node in the cluster of nodes, wherein the other node previously lacked any version of the user-selected database replica.

13. The method of claim 8, wherein the method further comprises performing a full backup of the user-selected node prior to restoring the user-selected database replica to the user-selected node.

14. The method of claim 13, wherein restoring the user-selected database replica to the user-selected node in the cluster of nodes is based on the full backup of the user-selected node performed prior to restoring the user-selected database replica to the user-selected node.

15. A computer program product, comprising a non-transitory computer-readable medium having a computer-readable program code embodied therein to be executed by one or more processors, the program code including instructions to:
   back up an availability group from a node in a cluster of nodes based on an identifier of the cluster of nodes;
   output information associated with at least one database replica in any availability group which is backed up based on the identifier of the cluster of nodes in response to a user request for the information; and
   restore a user-selected database replica to a user-selected node in the cluster of nodes based on a user selecting at least some of the information.

16. The computer program product of claim 15, wherein restoring the user-selected database replica to the user-selected node in the cluster of nodes comprises overwriting an existing version of the user-selected database replica.

17. The computer program product of claim 15, wherein restoring the user-selected database replica to the user-selected node in the cluster of nodes comprises restoring a plurality of different user-selected database replicas to a corresponding plurality of different user-selected nodes in the cluster of nodes.

18. The computer program product of claim 15, wherein the user-selected node in the cluster of nodes is the node in the cluster of nodes.

19. The computer program product of claim 15, wherein the user-selected node in the cluster of nodes is another node in the cluster of nodes, wherein the other node previously lacked any version of the user-selected database replica.

20. The computer program product of claim 15, wherein the program code includes further instructions to perform a full backup of the user-selected node prior to restoring the user-selected database replica to the user-selected node, wherein restoring the user-selected database replica to the user-selected node in the cluster of nodes is based on the full backup of the user-selected node performed prior to restoring the user-selected database replica to the user-selected node.

* * * * *